US 6,559,550 B2

(12) United States Patent
Herman

(10) Patent No.: US 6,559,550 B2
(45) Date of Patent: May 6, 2003

(54) NANOSCALE PIEZOELECTRIC GENERATION SYSTEM USING CARBON NANOTUBE

(75) Inventor: Frederick J. Herman, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/966,048

(22) Filed: Sep. 28, 2001

(65) Prior Publication Data

US 2002/0053801 A1 May 9, 2002

Related U.S. Application Data

(60) Provisional application No. 60/245,929, filed on Nov. 3, 2000.

(51) Int. Cl.[7] .................................................. H02P 9/04
(52) U.S. Cl. ......................................................... 290/1 R
(58) Field of Search ........................................... 290/1 R

(56) References Cited

U.S. PATENT DOCUMENTS

| | | | | |
|---|---|---|---|---|
| 5,552,656 A | * | 9/1996 | Taylor | 310/317 |
| 5,621,264 A | * | 4/1997 | Epstein et al. | 310/339 |
| 5,703,474 A | * | 12/1997 | Smalser | 310/318 |
| 5,753,088 A | * | 5/1998 | Olk | 204/173 |
| 5,773,834 A | * | 6/1998 | Yamamoto et al. | 204/192.11 |
| 5,835,996 A | * | 11/1998 | Hashimoto et al. | 310/319 |
| 6,002,471 A | * | 12/1999 | Quake | 250/458.1 |
| 6,038,060 A | * | 3/2000 | Crowley | 257/465 |
| 6,041,600 A | | 3/2000 | Silverbrook | 60/528 |
| 6,083,624 A | * | 7/2000 | Hiura | 204/192.15 |
| 6,157,043 A | * | 12/2000 | Miyamoto | 257/22 |
| 6,216,631 B1 | * | 4/2001 | Wissner-Gross | 118/50.1 |
| 6,246,970 B1 | * | 6/2001 | Silverbrook et al. | 702/117 |
| 6,290,861 B1 | * | 9/2001 | Silverbrook | 216/27 |
| 6,312,768 B1 | * | 11/2001 | Rode et al. | 427/249.1 |

FOREIGN PATENT DOCUMENTS

| | | | |
|---|---|---|---|
| EP | 0 673 102 A1 | 3/1995 | ............. H02J/7/00 |
| GB | 2 326 275 A | 12/1998 | ......... H01L/41/113 |
| JP | 06310976 A | * 11/1994 | |
| JP | 2002070938 A | * 3/2002 | |
| WO | 97/15876 | 5/1997 | ............. G05F/5/00 |
| WO | WO 97/15876 | 5/1997 | ............. G05F/5/00 |
| WO | 00/50771 | 8/2000 | ............. F03G/7/00 |
| WO | WO 00/50771 | * 8/2000 | |

OTHER PUBLICATIONS

Notification of Transmittal of the International Search Report or the Declaration; PCT/US01/31844; mailed May 17, 2002.

Session 0C02—Fullereness & Nanotubes IV., Focus Session, Wednesday morning, Mar. 24, Room 361W, GWCC, www.iptsg.epfl.ch/aps/meet/CENT99/BAPS/abs/S5425.html, pp. 1–4.*

"Carbon Nanotube Actuators" by Ray H. Baughman, et al., Science Magazine, vol. 284, pp. 1340–1344, May 21, 1999.

"Carbon Nanotube Bimorph Actuators and Force Sensors" Brian Hunt, et al., NASA Tech Brief, vol. 25, No. 9, Jet Propulsion Laboratory, California Institute of Technology, Sep. 1, 2001.

* cited by examiner

Primary Examiner—Nestor Ramirez
Assistant Examiner—Julio C. Gonzalez
(74) Attorney, Agent, or Firm—Hughes & Luce LLP

(57) ABSTRACT

A system and method for supplying electricity for use with a host device. The system includes a structure and an interface. The structure includes an array of single-walled carbon nanotubes arranged with respect to a matrix. In operation, the system receives a force stimulus for facilitating piezoelectric generation of electricity. In particular, the array receives the force and piezoelectrically generates electricity therefrom. The array is electrically coupled with the interface. The interface allows the structure to supply electricity to electrical devices that are coupled to the interface.

23 Claims, 5 Drawing Sheets

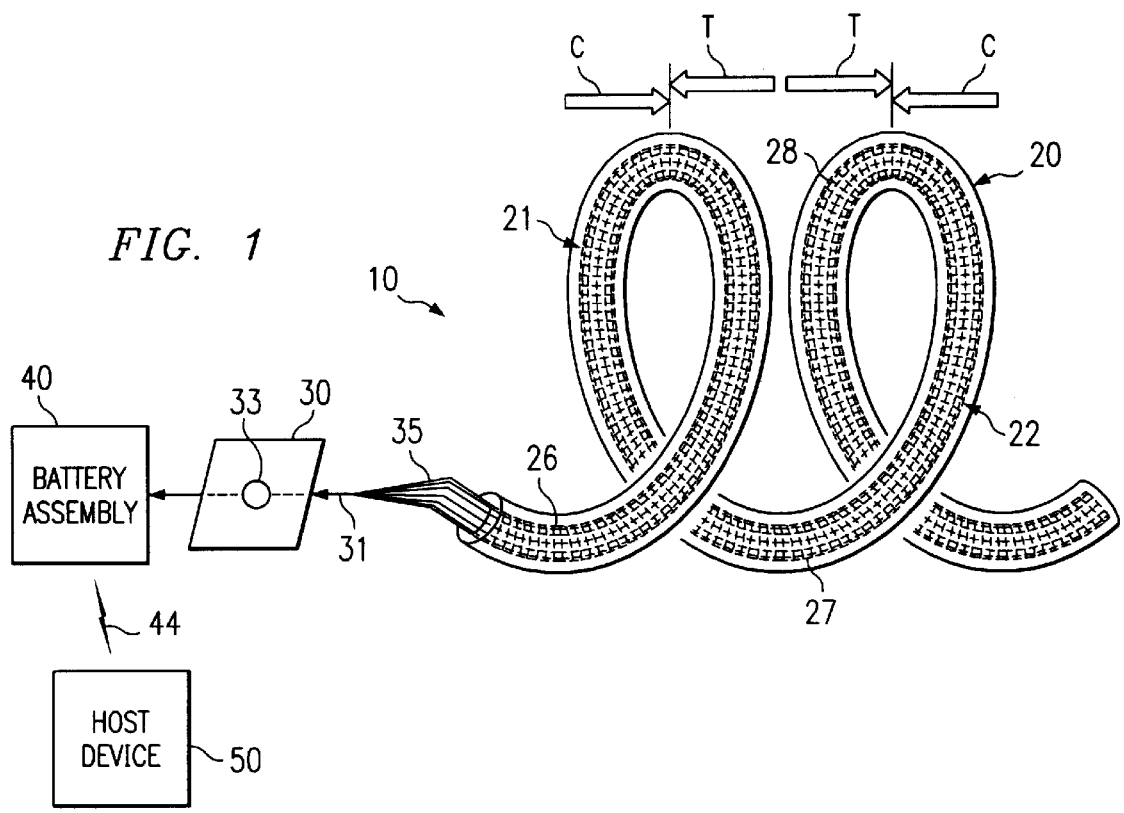
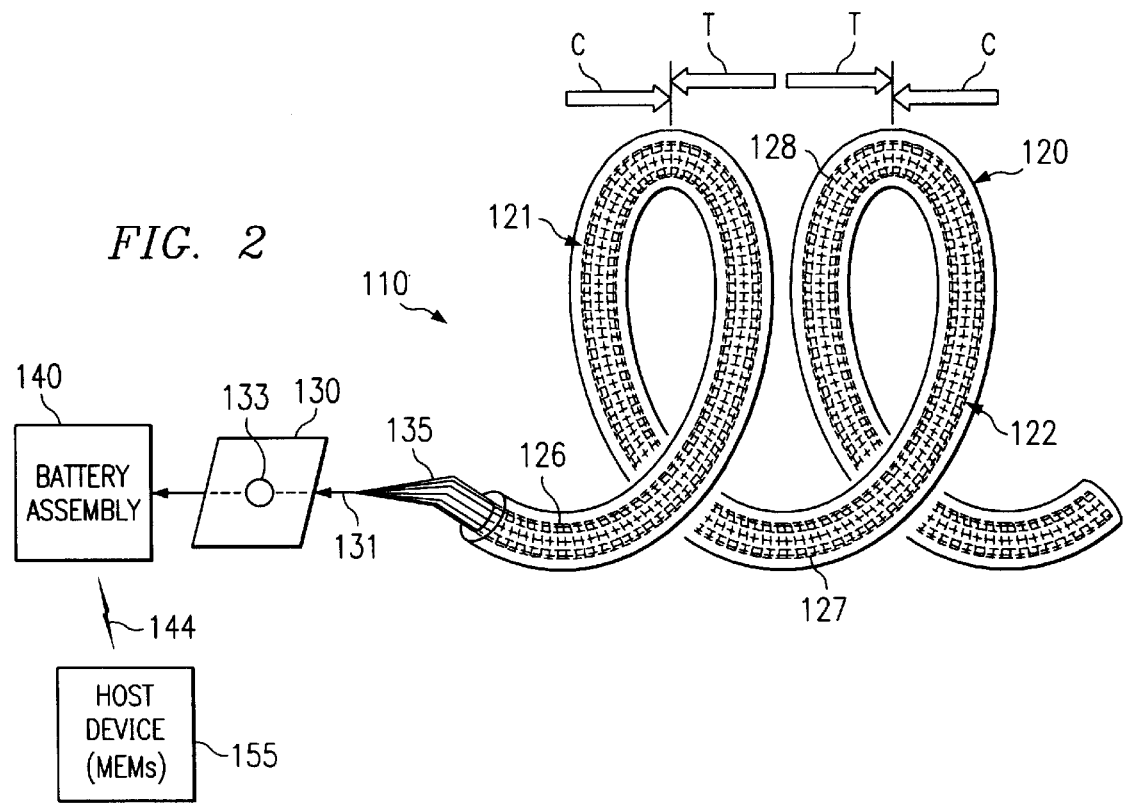

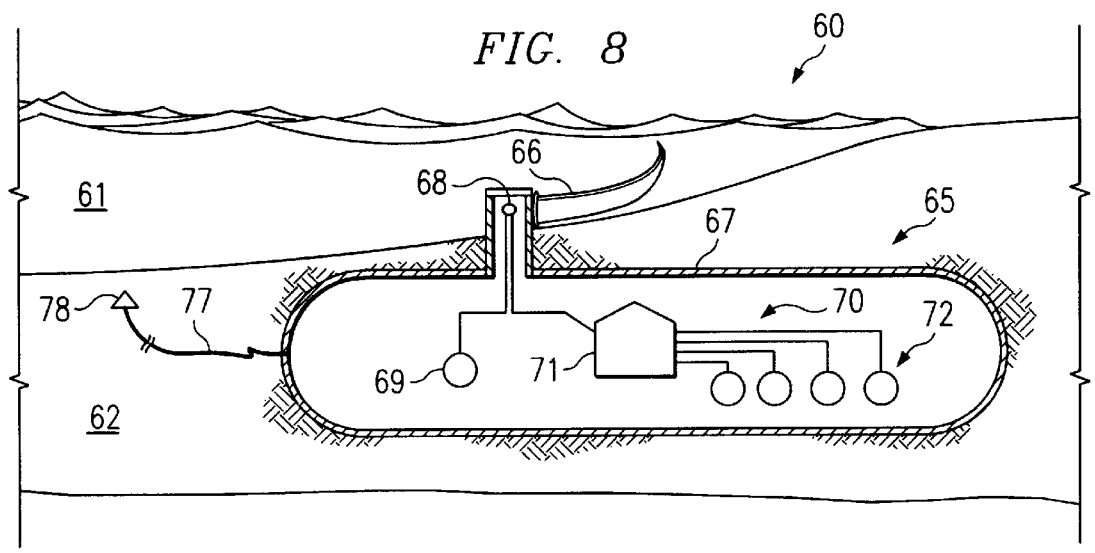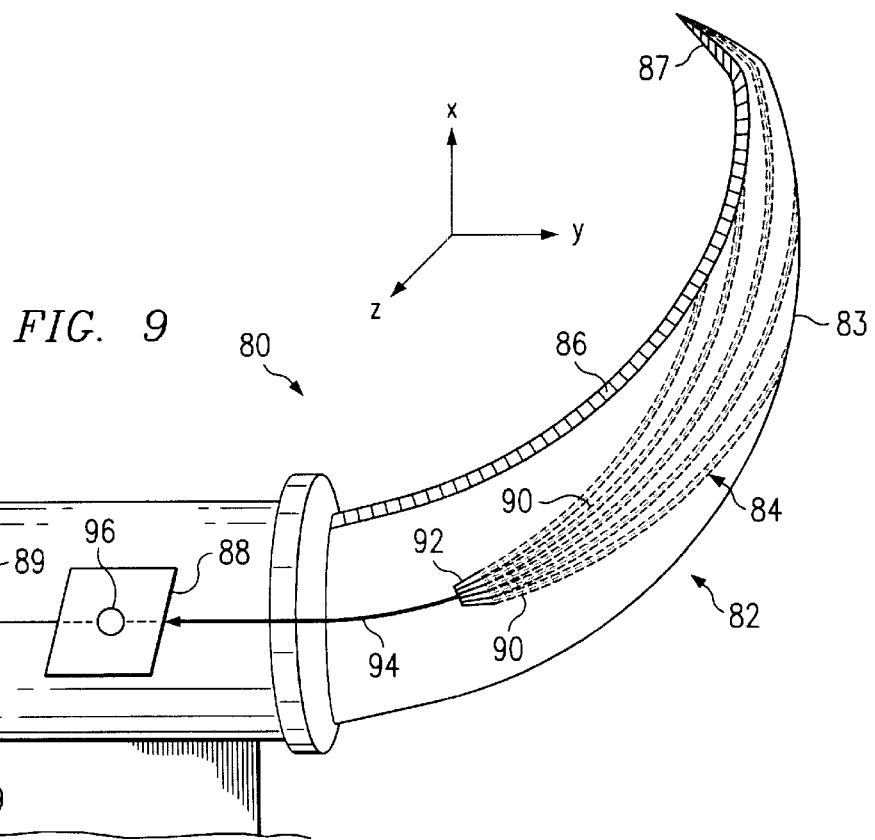

NANOSCALE PIEZOELECTRIC GENERATION SYSTEM USING CARBON NANOTUBE

This application claims the benefit of Provisional application Ser. No. 60/245,9229, filed Nov. 3, 2000.

BACKGROUND OF THE INVENTION

I. Field of the Invention

The present invention generally relates to material structures that generate electricity as a mechanical force is applied thereto. More particularly, this invention relates to a system and method for generating electricity for use with a host device. The system featuring an array of single-walled carbon nanotubes for receiving a mechanical force and piezoelectrically generating electricity therefrom.

II. Detailed Description of the Prior Art

Many typical examples of host systems, such as electric motor vehicles, remote sensory systems, portable and wireless information devices such as computers, cellular phones, and personal data assistance (PDAs) for example, require electricity to operate. Oftentimes, however, the operational life of these mobile host devices are restricted because these devices are used in areas away from standard sources of electrical power, such as wall outlets for example.

Typically, to operate host devices in these remote areas, battery systems and/or portable generation systems such as petroleum powered electric generators are used to supply electricity. Battery systems are widely used for small electrical devices such as portable computers and cell phones whereas larger devices require portable generators or hybrid systems featuring generators and battery systems.

Unfortunately, as a further complication, battery systems and/or portable generators suffer from a finite operational life for supplying electricity to host devices. For example, battery systems drained of electrical energy require either recharging by interfacing with a standard electrical outlet or replacement by another battery so that host devices continue operation via a constant supply of electricity. Similarly, to drive their associated component parts for generating electricity, portable generators require refueling with fuel sources such as for example fossil fuels, nuclear fuel rods, and hydrogen fuel cells.

Despite our growing interdependence on electricity-based devices, existing remote electrical generation systems fail to supply electricity for elongated or continuous periods of operational use.

Many other problems and disadvantages of the prior art will become apparent to one skilled in the art after comparing such prior art with the present invention as described herein.

SUMMARY OF THE INVENTION

Three common allotropes of carbon are diamonds, graphite, and fullerenes, such as the Buckyball. For example, carbon nanotubes are a new type of fullerene that exhibit electrical characteristics including piezoelectric aspects as well as mechanical strength and strain characteristics greater than steel and other materials but exhibit very low density characteristics similar to or below that of current ceramic or polymer composites.

Carbon nanotubes typically are a hollow, tubular type of fullerene structure. Carbon nanotubes typically consist of two-dimensional sheets having a combination of hexagonal and, occasionally, heptagonal and pentagonal lattices. The sheets are folded together and often capped at both ends by a fullerene cap. Because of its tubular shape, a carbon nanotube extends outwardly to form a strand having a length that is potentially millions of times greater than its diameter.

It should be added that piezoelectric characteristics include the generation of electricity in the dielectric crystalline structures associated with carbon nanotubes when subjected to a mechanical force. Moreover, depending on the arrangement of their crystalline lattice structures, carbon nanotubes include varieties having combinations of insulating, semiconducting, and metallic electrical characteristics. In particular, the chirality or twist of the nanotube effects the conductance, density, lattice structure, and other properties associated with the nanotube.

Aspects of the invention are found in a system and method for supplying electricity for use with a host device. In one exemplary embodiment, the system includes a structure including an array of single-walled carbon nanotubes arranged with respect to a matrix.

In operation, the system receives a force stimulus for facilitating piezoelectric generation of electricity. Particularly, the array receives the force and piezoelectrically generates electricity therefrom. The system further includes an interface electrically coupled with the array. The interface allows the structure to supply electricity to electrical devices that are coupled to the interface.

In one aspect, the system further comprises a battery assembly electrically coupled to the interface. In operation, the battery assembly receives electricity from the array.

In one aspect, the interface includes a converter. The converter receives electricity from the array and provides conversion between direct and alternating current.

In one exemplary embodiment, the array includes a plurality of insulating single-walled carbon nanotubes. In another exemplary embodiment, the array includes a plurality of semiconducting single-walled carbon nanotubes. In another exemplary embodiment, the array includes a plurality of conducting single-walled carbon nanotubes.

In one aspect, the host device comprises a microelectromechanical system (MEMs). In another aspect, the host device comprises a nanoscale system that refers to a system sized within the range of $1\times10^{-9}$ meters. It should be further added that in one exemplary embodiment the structure comprises a spring.

In yet another aspect, a method includes supplying electricity for use with a host device. Moreover, a method includes a step for receiving electricity from an array via an interface electrically coupled to the array.

Other aspects, advantages, and novel features of the present invention will become apparent from the detailed description of the invention when considered in conjunction with the accompanying drawings.

BRIEF DESCRIPTION OF THE DRAWINGS

Skilled artisans appreciate that the elements in the figures are illustrated for simplicity and clarity and have not necessarily been drawn to scale. For example, to help improve understanding of embodiments of the present invention, the dimensions of some of the elements in the figures may be exaggerated relative to other elements.

The present invention is illustrated by way of example and not by limitation in the accompanying figures, and which like references indicate similar elements, and in which:

FIG. 1 is a schematic diagram illustrating a system according to the present invention, the system generating electricity and including an array of single-walled carbon nanotubes;

FIG. 2 is a schematic diagram illustrating another embodiment of a system for piezoelectrically generating electricity;

FIG. 3 is a schematic diagram illustrating various lattice structures of single-walled carbon nanotubes as configured for piezoelectrically generating electricity;

FIG. 8 is a schematic diagram illustrating a system for generating electricity based on mechanical wave motion; and FIG. 9 is a schematic diagram detailing the system of FIG. 8 including one aspect of electrically coupling an array of single-walled carbon nanotubes with an interface.

DETAILED DESCRIPTION OF THE PREFERRED EMBODIMENT

Figure 3A:
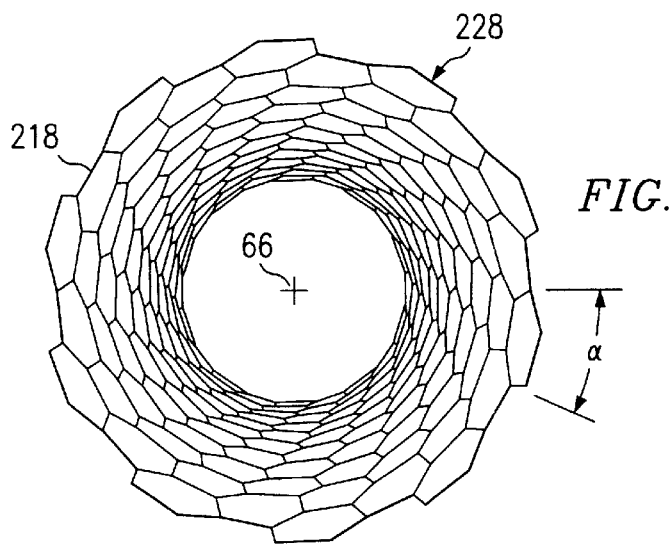
FIG. 3a shows a zigzag lattice for electrically insulating applications.

Preferred embodiments of the present invention are illustrated in the figures, like numerals being used to refer to like and corresponding parts of the various drawings. However, it is to be understood that the disclosed embodiments are merely exemplary of the invention, which may be embodied in various forms.

FIG. 1 illustrates one aspect, among others, of a system 10 for generating electricity for use with a host device 50. Generally, the system 10 receives a force stimulus for facilitating piezoelctrically generation of electricity.

As shown in FIG. 1, the system 10 includes a structure 20. The structure 20 includes a matrix 21 and an array of single-walled carbon nanotubes 22 arranged with the matrix 21.

In operation, the structure 20 receives a force. As such, the force displaces the array 22 so as to piezoelectrically generate electricity therefrom.

In effect, electricity is piezoelectrically generated for each single-walled carbon nanotube that is mechanically displaced from its initial position. Thus, collectively, each single-walled carbon nanotube cooperates with another so that the array 22 generates electricity characterized by the sum total of each mechanically displaced single-walled carbon nanotube.

The amount of electricity generated by the structure 20 depends on the total number of carbon nanotubes that form the array 22. The amount of electricity generated by the structure may further depend on the shape and size configuration of the structure 20, the matrix 21, and the array 22. The amount of electricity generated by the structure 20 may still further depend on the shape and size configuration of the lattice structure of each single-walled carbon nanotube provided by the array 22. Illustratively, for example, the array 22 may include a plurality of insulating single-walled carbon nanotubes 26, a plurality of semiconducting single-walled carbon nanotubes 27, and/or an array of conducting or highly conducting carbon nanotubes 28.

Those of ordinary skill in the art will readily recognize that the structure 20 may be configured to any shape or size configuration so long as it accommodates a force displacement to piezoelectrically generate electricity. Thus, as indicated in FIG. 1 as the letter "C", compressive forces exert against the structure 20 so that the array 22 becomes mechanically displaced. This force exertion thereby piezoelectrically generates electricity as carbon nanotubes are displaced. Illustratively, in a similar manner, the array 22 peizoelectrically generates electricity as a tensile force, indicated in FIG. 1 by the letter "T", is exerted on the structure 20.

In one exemplary embodiment, shown in FIG. 1, the structure 20 comprises a spring configuration. Accordingly, the displacement from an initial position and the return movement to the initial position by the spring structure 20 provides for enhanced peizoelectric generation of electricity as the array 22 moves about.

In one exemplary embodiment, the matrix 21 is composed of a material for electrically accommodating the array 22. In one exemplary embodiment, the matrix 21 includes at least one electrolytic material. In one exemplary embodiment, the matrix 21 is composed of a resilient material such as for example an elastomer or smart material, for accommodating displacement of the array 22.

As discussed in further detail below, the array 22 in one exemplary embodiment is arranged with respect to the matrix 21 so as to optimize piezoelectric generation of electricity. Illustratively, for the exemplary embodiments of FIGS. 1 and 2, the array 22 comprises a mesh or "net-shaped" configuration. As such, the single-walled carbon nanotubes defining the array 22 are arranged in a net or mesh-shaped configuration so as to form an electrical circuit for the piezoelectric generation and transfer of electricity from the structure 20. Moreover, due to the strength and fracture characteristics of each carbon nanotube, the mesh-like structure allows for the carbon nanotubes to reinforce the matrix 21 so that, ultimately, the structure 20 maintains its optimal shape and size despite repetitive displacement thereof by mechanical forces. Illustratively, in one exemplary embodiment, the net-shape provided by the array 22 of single-walled carbon nanotubes strengthens a structure 20 having a spring configuration. In one alternative exemplary embodiment, an array 84 of FIG. 9 comprises a fan-like shape so that a distal region of a structure 82 has a greater concentration of single-walled carbon nanotubes as compared with an opposing region that undergoes less displacement and, thus, including a lesser amount of single-walled carbon nanotubes.

With reference to FIG. 1, the system 10 further includes an interface 30 electrically coupled to the array 22. Operatively, the interface 30 receives the electricity generated by the array 22. Moreover, the interface 30 links to electrical devices so that electricity is transferred from the array 22 through the interface 30 and to an electrical device, such as, among others, a battery assembly or a host device.

In one exemplary embodiment, as shown in FIG. 1, the interface 30 includes a lead assembly 35. The lead assembly 35 is electrically coupled to the array 22 so that electricity is transferred from the structure 20 to the lead assembly 35.

The lead assembly 35 includes a line 31. Operatively, electricity is transferred from the lead assembly 35 through the interface 30 by line 31.

In one exemplary embodiment, the interface includes a converter 33. The converter 33 receives electricity from the array 22 and provides for the conversion of direct current and alternating current. Moreover, in one exemplary embodiment, the converter 33 comprises an inverter of a type well known in the industry. Such as for example a 5.0 kilowatt (kW) DC-AC sine-wave inverter by TDI of Cedar Knolls, N.J.

With reference to FIG. 1, the system 10 may further include a battery assembly 40 electrically coupled to the interface 30. Operatively, electricity received from the array 22 through the interface 30 is used to recharge the battery assembly 40. In one exemplary embodiment, the interface 30 includes circuitry for implementing a trickle recharge sequence so as to gradually recharge the battery assembly 40. In one exemplary embodiment, the battery assembly 40 comprises a plurality of batteries for recharging by the structure 22.

Ultimately, as indicated in FIG. 1 by reference arrow 44, electricity generated by the array 22 is transferred from the system 10 to the host device 50. Those of ordinary skill in the art will recognize that the host device includes any device or devices that require electricity for operation thereof, such as for example direct current or alternating current. For example, among others, a host device may include a cell phone, a digital camera, and a portable computer.

Those of ordinary skill in the art will readily recognize that other exemplary embodiments do not require coupling a battery assembly 40 to an interface 30 to ultimately provide electricity to a host device 50. Alternatively, the interface 30 coupled with a converter 33 may provide alternating current directly to a host system 50.

In summation, the operation of the system 10 for providing electricity to the host device 50 is as follows. A mechanical force exerted on the structure 20 displaces the array 22 so that the carbon nanotubes comprising the array 22 piezoelectrically generate electricity. The array 22 forms a circuit for transferring the generated electricity from the structure 20 to the interface 30. The interface 30 is provided by the system 10 to ultimately transfer electricity to the host device 50.

Referring to the exemplary embodiment of FIG. 2, a system 110 generates electricity for use with a host device 155. The host device 155 in one exemplary embodiment comprises a microelectrolmechanical (MEM) system so that carbon nanotubes from an array 122 piezoelectrically generate electricity for consumption by the host device 155. The host device 155 in one exemplary embodiment comprises a system scaled in size in the range between $1 \times 10^{-6}$ meters to $1 \times 10^{-9}$ meters so that carbon nanotubes from an array 122 piezoelectrically generate electricity for consumption by the host device 155. The host device 155 in one exemplary embodiment comprises a system scaled in size to about $1 \times 10^{-9}$ meters so that carbon nanotubes from an array 122 piezoelectrically generate electricity for consumption by the host device 155.

The exemplary embodiment of FIG. 2 is similar to the exemplary embodiment of FIG. 1. Alternatively, however, the system 110 of FIG. 2 provides electricity to a. MEMs host device 155. As such, the system 110 includes a structure 120, having an array 122 arranged with respect to a matrix 121. The array 122 is comprised of carbon nanotubes including, among others, insulating single-walled carbon nanotubes 126 semiconducting single-walled carbon nanotubes 127, and conducting single-walled carbon nanotubes 128. The system 110 further includes an interface 130. The interface 130 includes a lead assembly 135, a line 131, and, optionally, a converter 133. The system 110 further includes a battery assembly 140 coupled with the interface 130. Ultimately, shown in FIG. 2 as reference arrow 144, the system 110 provides electricity to the MEMs host device 155.

FIG. 3 shows the various lattice structures associated with the single-walled carbon nanotubes forming the array 22.

It should also be said that those of ordinary skill in the art would recognize that the array 22 may include any combination of lattice structures shown in FIG. 3. Accordingly, each carbon nanotube includes a symmetrical axis 66 extending substantially along the centerline of each of the single-walled carbon nanotubes.

FIG. 3a shows an electrically insulating single-walled carbon nanotube 228. As such, the array 22 may include a plurality of insulating single-walled carbon nanotubes 128. Accordingly, the insulating single-walled carbon nanotube 228 includes an insulating lattice structure 218. As shown in FIG. 3a, the insulating lattice structure 218 shows the formation of lattices at an angle $\alpha$ from the symmetrical axis 66. The angle $\alpha$ for the lattice structure 218 is 30° from the symmetrical axis 66. In one exemplary embodiment, the lattice structure 218 comprises a zigzag formation. Accordingly, each insulating single-walled carbon nanotube 228 is configured to prohibit the flow of electricity therethrough.

Figure 3B:
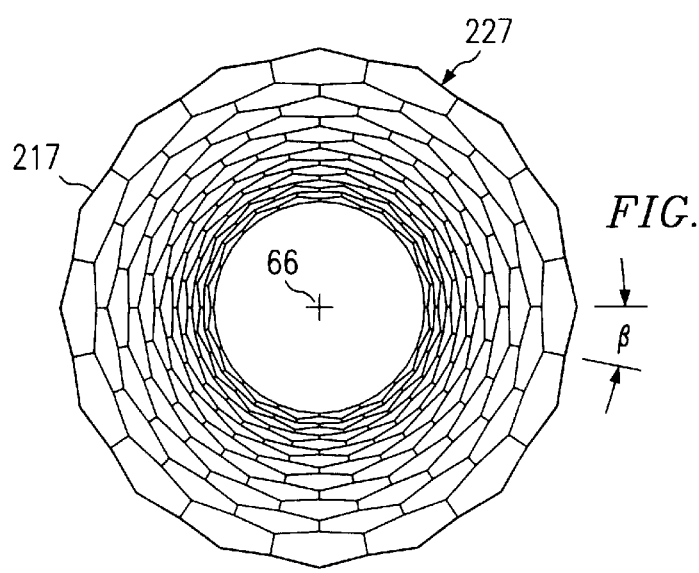
FIG. 3b shows a chiral lattice for electrically semiconducting applications.

Referring to FIG. 3b, a semiconducting single-walled carbon nanotube 227 is shown. In one exemplary embodiment, the array 22 includes a plurality of semiconducting single-walled carbon nanotubes 227. Each semiconducting single-walled carbon nanotube 227 includes a semiconducting lattice structure 217.

Accordingly, as shown in FIG. 3b, each lattice structure 217 is positioned at an angle $\beta$ from the symmetrical axis 66. In one exemplary embodiment, for the semiconducting lattice structure 217, the angle $\beta$ is greater than 0° but less than 30°. In one exemplary embodiment, the lattice structure 217 comprises a chiral configuration. As such, each semiconducting single-walled carbon nanotube 227 of the array 22 is configured to inhibit the flow of electricity therethrough.

Figure 3C:
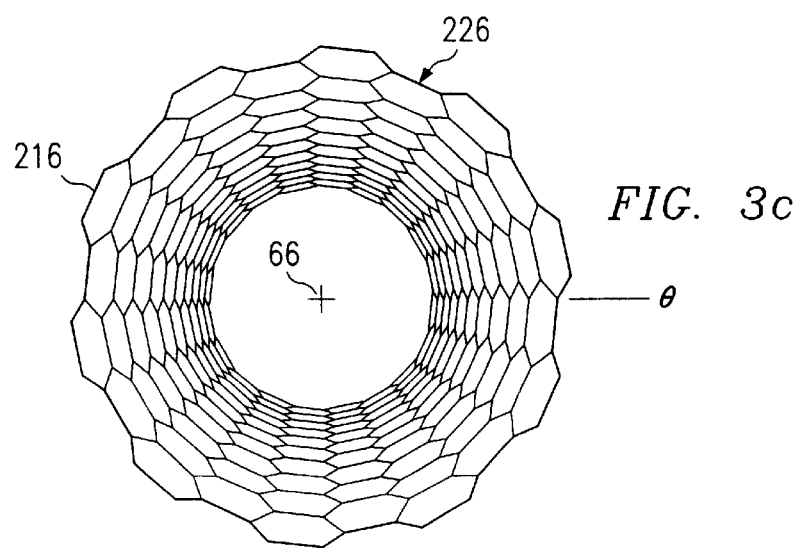
FIG. 3c shows an armchair lattice for electrically highly conducting applications.

With reference to FIG. 3c, a conducting single-walled carbon nanotube 226 is shown. The conducting single-walled carbon nanotube 226 includes a conducting lattice structure 216. As shown in FIG. 3c, each lattice structure 216 is positioned with respect to the symmetrical axis 66 at an angle $\theta$. The angle $\theta$ for the lattice structure 216 is 0° from the symmetrical axis 66. In one exemplary embodiment, the lattice structure 216 comprises and armchair configuration. Accordingly, each conducting single-walled carbon nanotube of the array 22 is configured to promote the flow of electricity therethrough.

Moreover, in one exemplary embodiment, each conducting single-walled carbon nanotube 226 of the array 22 is configured to promote the highly conducting flow of electricity therethrough. In particular, for a highly conducting configuration, the conducting lattice structures 216 are aligned in parallel with the symmetrical axis 66. It should be added that in this application and appended claims the term highly conducting refers to a carbon nanotube's ability to transport electricity with substantially no losses. However, in one exemplary embodiment, those of ordinary skill in the art will recognize an inherent resistive loss as electricity is transferred between an array and an interface.

In short, varying the lattice structures of each single-walled carbon nanotube of the array 22 changes that nanotube's ability to conduct electricity therethrough. Depending on the application, the array 22 may include any combination insulating, semiconducting, and conducting single-walled carbon nanotubes. Furthermore, it should be added that in other exemplary embodiments, the array 22 includes nanotubes other than single-walled carbon nanotubes, such as for example multi-walled carbon nanotubes having similar mechanical and electrical characteristics.

Figure 4:
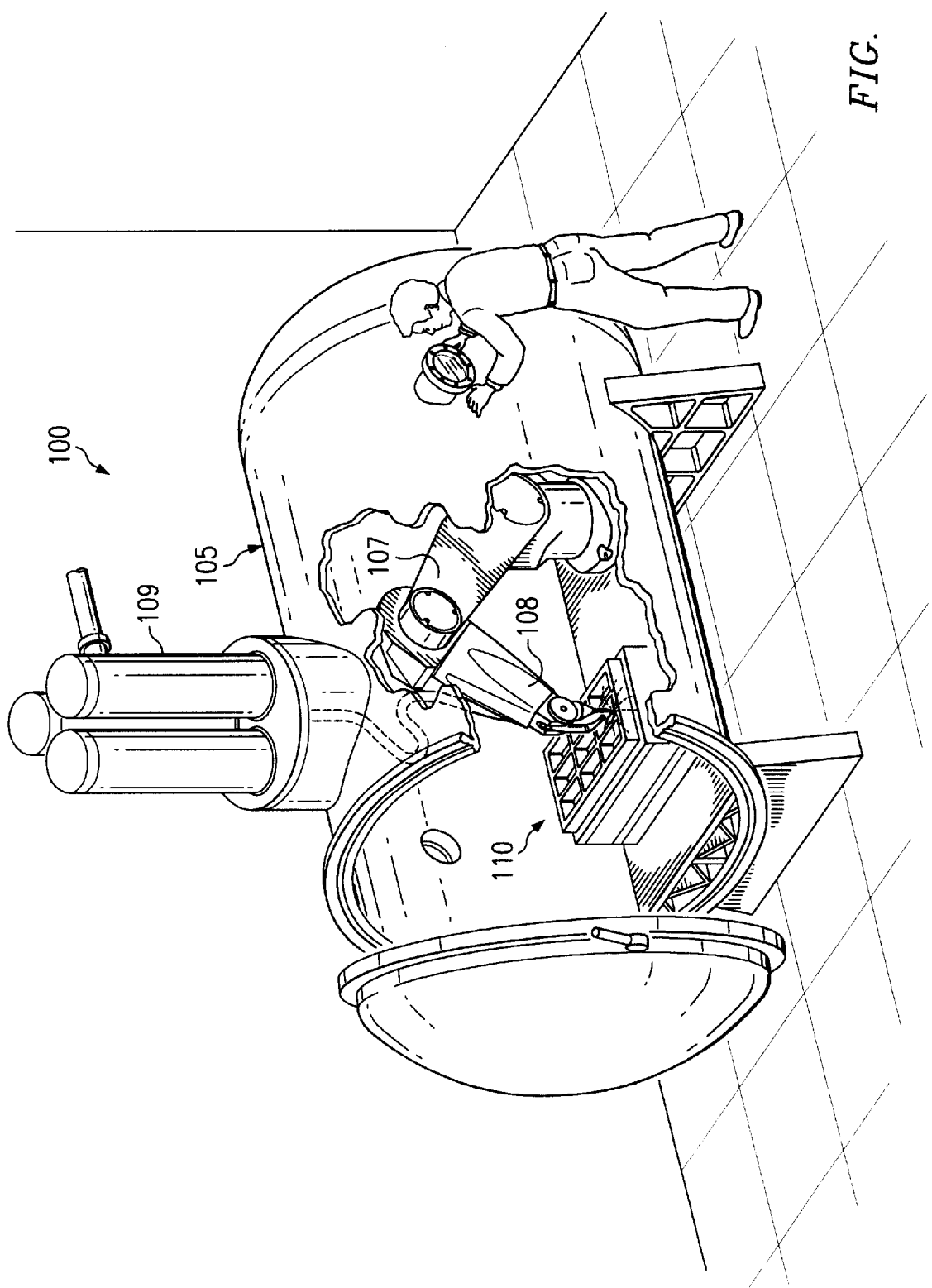
FIG. 4 is a schematic diagram illustrating a structure formation assembly for creating the array of single-walled carbon nanotubes of FIG. 1.

FIG. 4 refers to a schematic diagram detailing some aspects of arranging single-walled carbon nanotubes to define an array. In particular, FIG. 4 shows one exemplary embodiment for the production of a structure including at least one array. A system 100 arranges the array with respect to a matrix provided by a structure 110. For the system 100 of FIG. 4, the structure 110 including at least one array of single-walled carbon nanotubes is formed within a controlled environment 105.

In particular, a device 107, such as for example a lasing system, is used to form the structure 110. Examples of the device 107, among others, include a high energy density system, a lasing system, an electron beam device, an electric arc device, a chemical vapor deposition device, and a molecular beam epitaxi device. The device 107 includes a formation element 108. The formation element 108 generates a structure including a matrix and at least one array of single-walled carbon nanotubes arranged with respect to the matrix. The formation element 108 arranges single-walled carbon nanotubes with respect to the matrix so as to define at least one array for the piezoelectric generation of electricity.

Illustratively, for example the device may comprise an industrial laser of a type well known in the industry. The industrial laser is coupled to a support assembly 109 for facilitating the generation of laser energy within the controlled environment 105. Illustratively, in operation, the array is formed by subjecting the matrix to laser energies from the device 107 according to established procedures of a type well known in the industry, such as laser ablation or electric arc discharge for example. Accordingly, the structure 110 is formed by the system 100.

Figure 5:
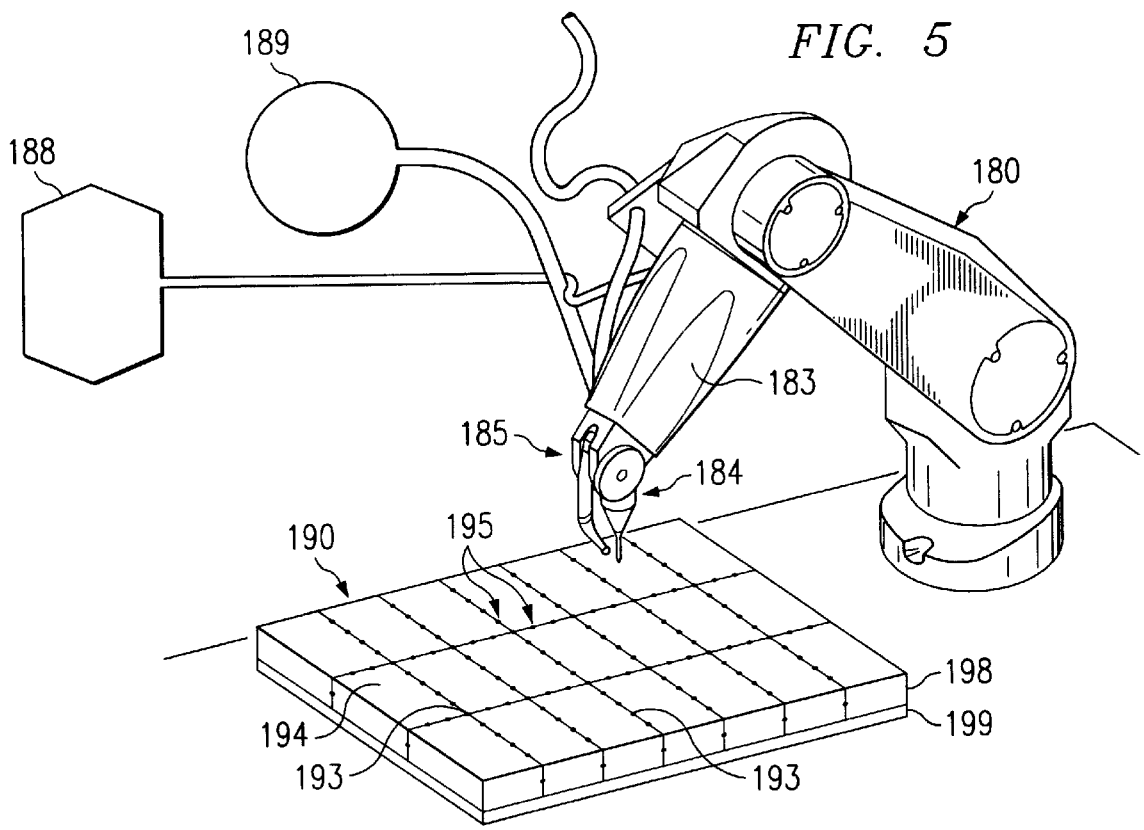
FIG. 5 is a schematic diagram detailing some aspects of the arrangement of single-walled carbon nanotubes with respect to an array.

For the exemplary embodiment of FIG. 5, a device 180 is provided for the generation of structures that includes at least one array of single-walled carbon nanotubes. In the embodiment of FIG. 5, a multiplicity of single-walled carbon nanotubes are produced ex situ from that of a structure. Specifically, a single-walled carbon nanotube feedstock, produced ex situ, is supplied to the device 180 from a feedstock source 189. The device 180 includes a generating element 183. The generating element 183 includes a supply unit 185 coupled to the feedstock source 189 for providing single-walled carbon nanotubes to a structure via the single-walled carbon nanotube feedstock 189. In one exemplary embodiment for example, the generating element 183 includes a lasing energy applicator 184 for the formation of at least one array of single-walled carbon nanotubes with respect to a matrix.

It should also be said that a control system 188 is coupled to the device 180. The control system 188 controls the supply of single-walled carbon nanotube feedstock from the feedstock source 189 with respect to the formation of a structure. The control system 188 further provides for the arrangement of each array of single-walled carbon nanotubes within the structure as implemented by the processing device 180.

A structure 190 of FIG. 5 includes a composite 198 disposed on a substrate 199. Those of ordinary skill in the art will readily recognize that other embodiments of the structure 190 may exclude a substrate.

For the embodiment of FIG. 5, the structure 190 includes a plurality of arrays 193 that comprise a net, web, and/or mesh-like shape following a grid-like axis arrangement 195.

Moreover, at least one array of single-walled carbon nanotubes in one embodiment is defined by a network of carbon nanotube fibers arranged with respect to the matrix 194.

Figure 6:
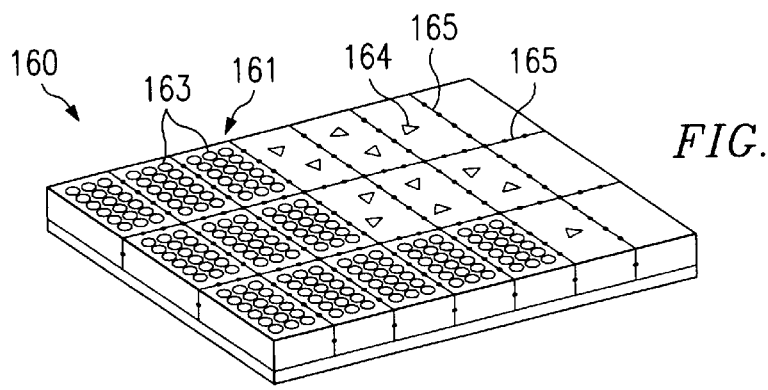
FIG. 6 is a schematic diagram detailing some aspects of the arrangement of single-walled carbon nanotubes with respect to an array.

For the embodiment of FIG. 6, a structure 160 comprises an array of single-walled carbon nanotubes 163 introduced in situ with respect to the matrix 161. Accordingly, the structure 160 includes a plurality of catalysts 164. As shown in FIG. 6, at least one array is arranged along a grid-like arrangement 165 so as to form a substantially mesh-like shape.

Figure 7:
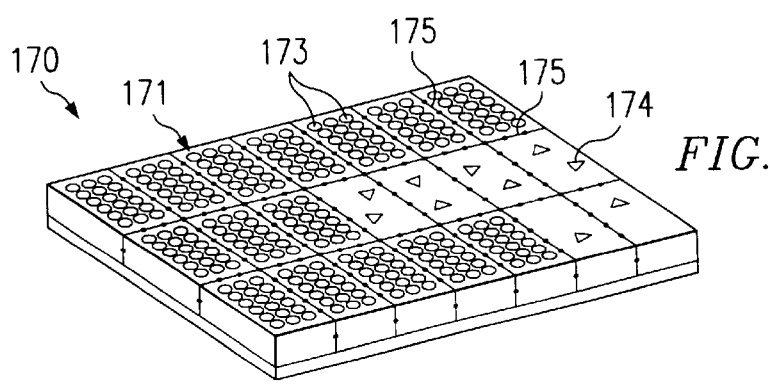
FIG. 7 is a schematic diagram detailing some aspects of the arrangement of single-walled carbon nanotubes with respect to an array.

For the embodiment of FIG. 7, a structure comprises an array of single-walled carbon nanotubes 173 introduced in situ with respect to the matrix 171. Accordingly, the structure 170 includes a plurality of catalysts 174. As shown in FIG. 7, at least one array is arranged along a grid-like axis arrangement 175 so as to form a mesh-like shape.

Illustratively, FIG. 8 refers to one exemplary embodiment of a system 60 for supplying electricity to a host device. The system includes structure 66. The structure 66 includes an array of single-walled carbon nanotubes arranged with respect to a matrix. The array receives a force via the wave motion from a body of water 61 so that the array piezoelectrically generates electricity therefrom. In one exemplary embodiment, as shown in FIG. 8, the structure 66 is in operational engagement with the tidal motion exerted by the body of water 61.

Those of ordinary skill in the art, however, will readily recognize other structural configurations that permit physical conditions to exert a force on the structure 66. For example, among others, motion may be exerted onto the structure 66 from a rapidly flowing stream, a gust of wind produced during flight, a solar wind, shifting particles such as sand and snow or by atmospheric conditions.

With reference to FIG. 8, the structure 66 is anchored within the ground 62 under the body of water 61. The system 60 of FIG. 8 includes an electric well assembly 65. The electric well assembly 65 includes a housing 67. In one exemplary embodiment, the housing 67 comprises a pressure vessel. In operation, the housing 67 contains storage units for holding the electricity generated by the structure 66. Moreover, the housing 67 anchors the structure 66 in position for engagement with the body of water 61.

The system 60 further includes an interface 68 electrically coupled with the structure 66. Electricity piezoelectrically generated from the displacement of carbon nanotubes within the structure 66 is transferred to the interface 68.

Storage units, such as batteries for example, are coupled to the interface 68 so as to receive the electricity from the interface 68. As shown in FIG. 8, a single storage unit 69 is coupled to the interface 68. Moreover, a multiple storage unit assembly 70 is coupled to the interface 68. The multiple storage unit assembly 70 includes a control system 71 coupled to an array of storage units 72. The control system 71 facilitates the distribution of electricity from the interface 68 to array of storage units 72. Thus, electricity is transferred from the interface 71 to the control system 71 to at least one of the storage units from the plurality of storage units 72 as selected by the control system 71.

In one exemplary embodiment, the electric well assembly 65 further includes an outlet line 77 coupled to the storage units within the housing 67. Moreover, an outlet interface 78 is coupled to the outlet line 77. The combination of the outlet line 77 and outlet interface 78 provide for the convenient and remote harvesting of electricity from the electric well assembly 65.

Illustratively, for example, the outlet interface 78 may float above the body of water 61 SO that electricity generated by the structure 66 is harvested above the body of water 61. In another embodiment, the outlet interface 78 may be coupled to a network of electric well assemblies for the collective harvesting of electricity from a plurality of structures 66. In another exemplary embodiment, the interface 78 and outlet line 77 may be positioned so as to transfer electricity through the ground 62 to a remote host device located on shore.

FIG. 9 refers to a system 80 for the generation of electricity that is similar to the system 60 of FIG. 8. The system 80 includes a structure 82 and an interface 88 electrically coupled with the structure 82. The structure 82 includes a matrix 83 and an array 84 including a multiplicity of single-walled carbon nanotubes 90.

In one exemplary embodiment, as shown in FIG. 9, the structure 82 comprises a hook-like configuration for optimal engagement with the tidal movement from a body of water. Optionally, the structure 82 includes fins 86 and 87 to enhance engagement with the moving body of water. As shown in FIG. 9, fin 86 is provided for engagement with moving fluids along a ZY plane whereas fin 87 is provided for engagement with fluid movement along a XY plane.

As mentioned above, the array of FIG. 9 comprises a fan configuration such that a greater concentration of single-walled carbon nanotubes are positioned within the matrix 83 at a hook-like, distal portion of the structure 82 that receives optimal movement by the tidal forces. Moreover, in one exemplary embodiment, the carbon nanotubes 90 include a plurality of highly conducting carbon nanotubes for the piezoelectric generation of electricity.

The system 80 includes an anchor 81 for affixing one end of the structure 82 thereto. Moreover, in one exemplary embodiment, the anchor 81 houses an interface 88. The interface 88 includes a terminal 92 electrically coupled with the array 84 for receiving electricity therefrom. In one exemplary embodiment, the interface 88 includes a converter 96 for converting direct current into alternating current. The system 80 further includes a battery assembly 89 electrically coupled to the interface 88.

In operation, electricity flows from the terminal 92 through the interface 88 along line 94 to the battery assembly 89. The battery assembly 89 collects electricity received from the array 84. Moreover, as indicated by reference arrow 99 of FIG. 9, the battery assembly 89 transfers electricity to a host device (not shown).

Although the present invention has been described in detail, it should be understood that various changes, substitutions, and alterations could be made hereto without departing from the spirit and scope of the invention as described by the appended claims that follow.

What is claimed is:

1. A system for generating electricity in response to a mechanical stimulus for a host device comprising:

a structure including a matrix and an array of single walled carbon nanotubes arranged with the matrix wherein each single wall carbon nanotube receives the mechanical stimulus and piezoelectrically generates electricity there from; and an interface electrically coupled with the array.

2. The system according to claim 1 further comprising a battery assembly electrically coupled to the interface.

3. The system according to claim 2 wherein the battery assembly receives electricity from the array.

4. The system according to claim 1 wherein the interface includes a converter.

5. The system according to claim 4 wherein the converter receives electricity from the array and converts the electricity to alternating current.

6. The system according to claim 1 wherein the array includes a plurality of insulating single walled carbon nanotubes.

7. The system according to claim 6 wherein each insulating single walled carbon nanotube is configured to prohibit the flow of electricity through the insulating single walled carbon nanotube.

8. The system according to claim 1 wherein the array includes a plurality of semiconducting single walled carbon nanotubes.

9. The system according to claim 8 wherein each semiconducting single walled carbon nanotube is configured to inhibit the flow of electricity through the semiconducting single walled carbon nanotube.

10. The system according to claim 1 wherein the array includes a plurality of conducting single walled carbon nanotubes.

11. The system according to claim 10 wherein each conducting single walled carbon nanotube is configured to promote the flow of electricity through the conducting single walled carbon nanotube.

12. The system according to claim 10 wherein each conducting single walled carbon nanotube is configured to promote the highly conducting flow of electricity through the conducting single walled carbon nanotube.

13. The system according to claim 1 wherein the host device comprises a micro-electro-mechanical system.

14. The system according to claim 1 wherein the host device comprises a nanoscale system.

15. The system according to claim 1 wherein the structure comprises a coil-like shape.

16. A system for generating electricity in response to a force stimulus comprising:

a structure including a matrix and an array of carbon nanotubes arranged with the matrix wherein each carbon nanotube receives the force stimulus and piezoelectrically generating electricity there from; and an interface electrically coupled with the array.

17. A system for recharging a battery, the system receiving a mechanical stimulus for facilitating generation of electricity, the system comprising:

a structure including a matrix and an array of single walled carbon nanotubes arranged with the matrix wherein each single walled carbon nanotube receives mechanical stimulus and piezoelectrically generating electricity there from; and an interface electrically coupled with the array and with the battery;

the battery receiving electricity from the array through the interface.

18. A method for supplying electricity for use with a host device, the method comprising the steps of:

applying a force to a structure;
  the structure including a matrix and an array of single walled carbon nanotubes arranged with the matrix, wherein said single walled carbon nanotubes piezo-electrically generate electricity when acted on by said force;
receiving the electricity from the array via an interface electrically coupled to the array; and
transferring electricity from the interface to the host device;
  the host device coupled to the interface.

19. The method according to claim 18 further including the step of:
  transferring electricity from the interface to a storage unit;
  the storage unit electrically coupled to the host device.

20. The method according to claim 19 wherein the step of transferring electricity includes the step of prohibiting the flow of electricity through a plurality of insulating single walled carbon nanotubes included by the array.

21. The method according to claim 19 wherein the step of transferring electricity includes the step of inhibiting the flow of electricity through a plurality of semiconducting single walled carbon nanotubes included by the array.

22. The method according to claim 19 wherein the step of transferring electricity includes the step of promoting the flow of electricity through a plurality of conducting single walled carbon nanotubes included by the array.

23. A method for storing electricity generated by applying a force to a structure, the structure including a matrix and an array of single walled carbon nanotubes arranged with the matrix so that electricity is piezoelectrically generated by said single walled carbon nanotubes within said array based on the application of the force to the structure, the method comprising the steps of:

receiving the electricity from the array via an interface electrically coupled to the array; and transferring electricity from the interface to a storage unit;
  the storage unit electrically coupled to the interface.

* * * * *